July 4, 1933.  P. MARCHIO  1,917,137
BANANA EXTRACTOR AND ICE CREAM INJECTOR
Filed July 25, 1932
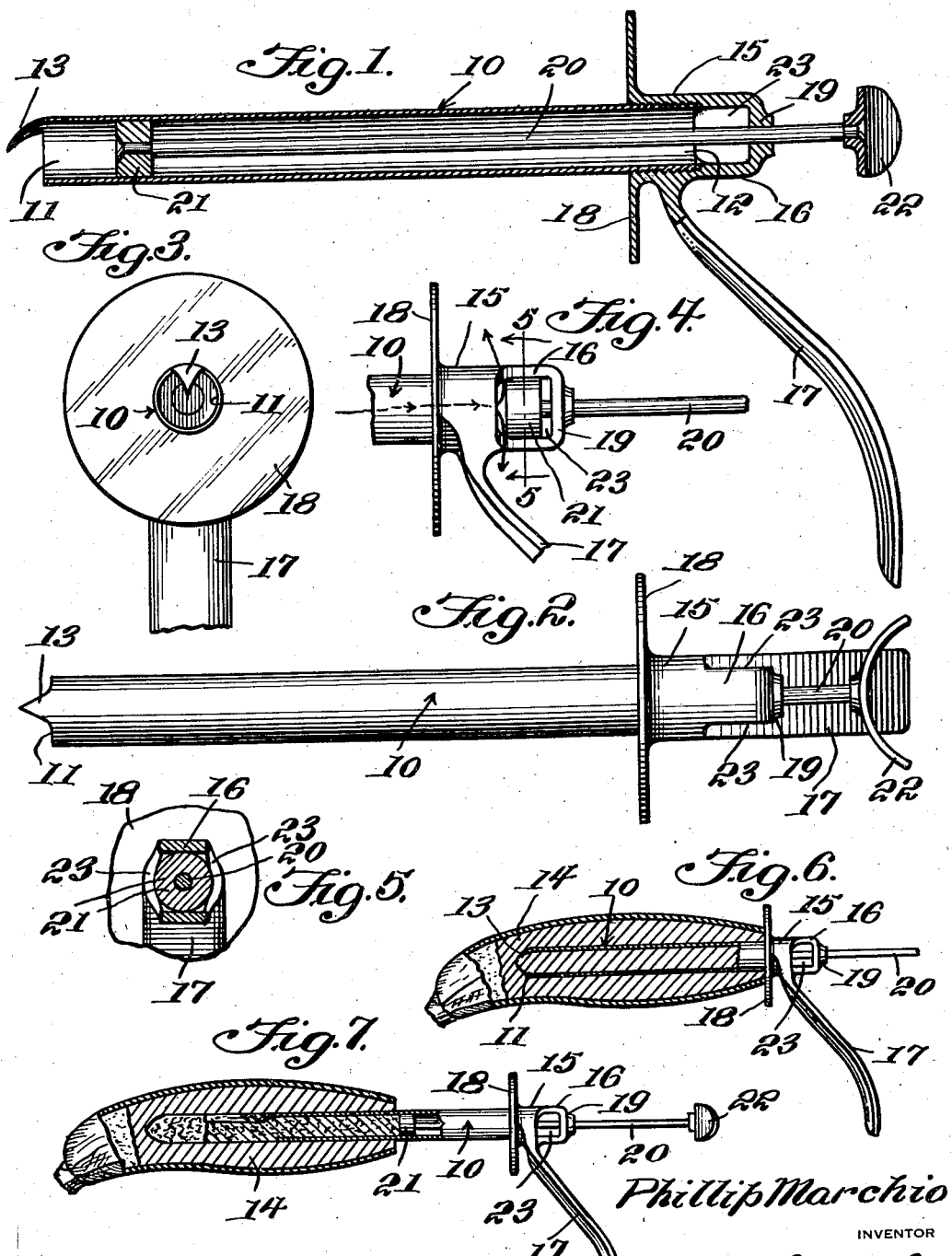
Phillip Marchio
INVENTOR
BY Victor J. Evans & Co.
ATTORNEY
WITNESS: J.T.L. Wright Patented July 4, 1933

1,917,137

UNITED STATES PATENT OFFICE

PHILLIP MARCHIO, OF NORTH ADAMS, MASSACHUSETTS

BANANA EXTRACTOR AND ICE CREAM INJECTOR

Application filed July 25, 1932. Serial No. 624,634.

The invention relates to an implement for coring bananas and filling the latter through the cored portion with ice cream and more particularly to a banana extractor and ice cream injector.

The primary object of the invention is the provision of an implement of this character, wherein the barrel or cylinder thereof is formed with a knife tip so that the said barrel or cylinder can be readily inserted within a banana to bore or core the same and thereafter a charge of ice cream introduced within the banana so that the same may be consumed, that is, the ice cream, on the eating of the banana, thus effecting a combination of banana and ice cream in a convenient and attractive form.

Another object of the invention is the provision of an implement of this character, wherein the barrel or cylinder is of a construction, whereby the piston working therein can be pulled therefrom without separation so that the said barrel or cylinder can be readily cleaned by flowing water or other cleaning medium therethrough and thus rendering the implement thoroughly sanitary.

A further object of the invention is the provision of an implement of this character which is simple in construction, reliable and efficient in its working, hand operable, durable, strong, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a vertical longitudinal sectional view through an implement constructed in accordance with the invention.

Figure 2 is a plan view thereof.

Figure 3 is an end elevation.

Figure 4 is a fragmentary side elevation showing the head end of the barrel or cylinder with the piston drawn into the head for permitting the cleaning of the barrel or cylinder by a free flow of fluid therethrough.

Figure 5 is a sectional view on the line 5—5 of Figure 4 looking in the direction of the arrows.

Figure 6 is a fragmentary vertical sectional view through a banana showing the implement inserted therein for the coring of the same.

Figure 7 is a view similar to Figure 6 with the implement inserted for the filling of the cored banana with ice cream.

Similar reference characters indicate corresponding parts throughout the several views in the drawing.

Referring to the drawing in detail, the implement comprises a tubiform barrel or cylinder 10 which is of uniform cross sectional diameter throughout with opposite open ends 11 and 12 respectively, the end 11 being formed with an inwardly curved outwardly tapering knife tip or blade 13 which functions to cut the body of a banana 14 when the barrel or cylinder 10 is inserted in one end thereof on the opening of the skin of said banana or the transverse severance of said end for the coring or central boring of the body of the banana.

The barrel or cylinder 10 at the end 12 is threaded into a cup-like head 15 which latter is formed with a pocket or cell 16 beyond the end 12 of the barrel or cylinder 10 at the engaging portion thereof with the head. This head 15 is provided with an angularly disposed handle 17 and also forwardly thereof with a disk-like shield or guard 18, the latter being at the inner end of the head. At the outer closed end 19 of the head is fitted therein the stem 20 of a piston 21 which is slidably fitted within the barrel or cylinder 10.

The stem 20 carries at its end projected through the closed end 19 of the head 15 a hand grip 22 so that the piston 21 can be manually manipulated similarly to a syringe.

The head 15 at opposite sides is formed with openings 23, these being of a size substantially the extent of the cell 16 in the head so that when the piston 21 is pulled upon the latter will be drawn into the cell 16 so that water or other cleaning fluid may be poured into the barrel or cylinder 10 to flow therethrough and become discharged through the openings 23, thus cleaning the implement to render the same sanitary.

In the use of the implement as has been before stated the barrel or cylinder 10 is inserted into the body of the banana 14 through one end thereof and by turning such barrel or cylinder a boring action will be had in the banana for the coring thereof and the cored portion will be collected in the barrel or cylinder 10, whereupon on removal of said barrel or cylinder from the body of the banana the bored core thereof can be discharged or emptied by forcing the piston 21 in the direction of the end 11 of the barrel or cylinder. Thereafter a charge of ice cream can be drawn into the barrel or cylinder 10 by pulling outwardly upon the piston 21 and after the reception of the charge the said barrel or cylinder 10 will be introduced into the bore of the banana and the ice cream contained in this barrel or cylinder injected thereinto as will appear in Figure 7 of the drawing, while the coring of the banana is shown in Figure 6 of said drawing.

The implement in its construction constitutes an extractor and an injector as will be apparent from the foregoing description when taken in connection with the drawing as illustrated by Figures 6 and 7 thereof.

What is claimed is:

An implement of the character described comprising a straight unbroken tubiform body open at opposite ends, an outwardly tapered and inwardly curved single knife tip at one end of the body, a cylindrical hollow head telescoped on the other end of the body and forming a cell beyond the end of the body joined therewith, the head being formed with openings diametrically opposite each other and of a size substantially the same as the cell, an angularly disposed handle integrally formed with the head, a guard on the head in advance of the handle, and a piston reciprocatingly movable in the body and having a stem passed centrally through the head and having a cross piece forming a hand grip exteriorly of the head.

In testimony whereof I affix my signature.

PHILLIP MARCHIO.